United States Patent
Ma

Patent Number: 5,524,434
Date of Patent: Jun. 11, 1996

[54] INTERNAL COMBUSTION ENGINE

[75] Inventor: Thomas T. Ma, South Woodham Ferrers, Great Britain

[73] Assignee: Ford Motor Company, Dearborn, Mich.

[21] Appl. No.: 244,184

[22] PCT Filed: Nov. 2, 1992

[86] PCT No.: PCT/GB92/02017

§ 371 Date: May 17, 1994

§ 102(e) Date: May 17, 1994

[87] PCT Pub. No.: WO93/10338

PCT Pub. Date: May 27, 1993

[30] Foreign Application Priority Data

Nov. 22, 1991 [GB] United Kingdom .................. 91/24859

[51] Int. Cl.$^6$ ...................................... F01N 3/22
[52] U.S. Cl. .................. 60/290; 60/304; 60/305; 60/307
[58] Field of Search ............... 60/290, 304, 305, 60/306, 351

[56] References Cited

U.S. PATENT DOCUMENTS

| 3,390,520 | 7/1968 | Mattson | 60/307 |
| 3,470,689 | 10/1969 | Gurr | 60/307 |
| 4,177,640 | 12/1979 | Kuroda | 60/274 |
| 4,383,408 | 5/1983 | Vjihashi et al. | 60/290 |
| 4,583,363 | 4/1986 | Urushidani et al. | 60/290 |

FOREIGN PATENT DOCUMENTS

| 547949 | 4/1974 | Switzerland . |
| 603993 | 8/1978 | Switzerland . |

*Primary Examiner*—Leonard E. Heyman
*Attorney, Agent, or Firm*—Jerome R. Drouillard; Roger L. May

[57] ABSTRACT

An internal combustion engine 12 in which liquid fuel is introduced prior to the charge entering the combustion chambers is mounted in a vehicle having an air scoop 34 which acts as a source of ram air pressurised by the movement of the vehicle. The ram air is fed into the exhaust system by way of an isolation valve 36 which is opened only during engine deceleration modes and serves to reduce emissions of unburnt hydrocarbons and carbon monoxide caused by the fuel wetting the intake manifold.

6 Claims, 2 Drawing Sheets

INTERNAL COMBUSTION ENGINE

The present invention relates to an internal combustion engine in which liquid fuel is introduced prior to the charge entering the combustion chambers.

In petrol engines in which mixture preparation takes place outside the combustion chambers, for example by means of a carburettor or fuel injectors supplying fuel into the intake manifold or intake ports, engine deceleration is accompanied by a rich incomplete combustion because some fuel is stored in the intake system and this is stripped off from the wetted surface of the walls of the intake manifold and intake ports during the deceleration mode by the high manifold depression. Even if the fuel supply is cut-off completely during the deceleration mode, a sudden excursion of exhaust emissions will still occur since the engine air supply has been restricted and the stored fuel is burnt in the combustion chamber with insufficient air. The duration of the excursion is relatively short as the quantity of the stored fuel is finite and once used up there is no more fuel but nevertheless unburnt hydrocarbons are released to atmosphere during these periods as there is not sufficient oxygen in the exhaust system to allow them to be oxidised, even in a catalytic converter.

The present invention seeks to cut down on this source of air pollution by reducing the unburnt hydrocarbon content of the exhaust gases during deceleration modes.

According to the present invention, there is provided an internal combustion engine in which liquid fuel is introduced into the air intake system prior to the charge entering the combustion chambers and which is mounted in a vehicle having an air scoop acting as a source of ram air pressurised by the movement of the vehicle, characterised in that the ram air is fed into the exhaust system of the engine by way of an isolation valve which is opened only during engine deceleration modes.

In order to complete the combustion of the unburnt hydrocarbons in the exhaust system, a source of additional oxygen is required. Hitherto, various proposals have been made to add air into the exhaust system under different operating conditions. For this purpose, pulse air system have been put forward which rely on the pulsation of the gases in the exhaust manifold to draw in air during negative pressure parts of the cycles but such system do not draw in air during deceleration mode as the pressure pulse amplitude is severely attenuated at such times. Electrically driven air pumps have also been proposed but these have a slow response time and cannot be brought into operation sufficiently rapidly to respond to the engine entering a deceleration mode. Of course, if a continuously driven air compressor is available in the vehicle for some other reason, for example to assist fuel atomisation in a fuel injection system, its air may be diverted for this purpose but it is not an effective solution to provide a compressor exclusively for this purpose as the cost and energy consumption would be prohibitive.

The present invention provides a convenient, reliable and inexpensive air supply for counteracting hydrocarbon emissions during deceleration modes only having as a moving part a valve to admit air into the exhaust system when deceleration has been detected. The valve may be operated electrically or by intake manifold vacuum, the latter being particularly high when the engine is overrunning.

The invention takes advantage of the fact that during deceleration modes, the exhaust back pressure is minimal and only a small positive pressure is needed to ram air into the exhaust system. Furthermore, deceleration modes responsible for atmospheric pollution occur mostly when the vehicle is in motion, at which times the ram air pressure is always present.

The ram air pressure will be present whenever the vehicle is in motion and it is possible not to activate the isolation valve when the vehicle is travelling below a preset speed to avoid exhaust gases being expelled without passing through the exhaust system. Alternatively the valve may be connected in series with a weak non-return valve which only allows air to flow towards the exhaust system. In the latter case, it is important to ensure that there should not be too great a pressure drop across the non-return valve when the main valve is open as this would detract from the ram air effect.

To promote completion of combustion of the hydrocarbons by thermal oxidation, one may rely on the heat in the exhaust gases immediately after they leave the combustion chamber and before they have been cooled down in the exhaust pipe. For this reason, it is preferred to feed the ram air individually into each exhaust port by means of a rail having branches passing through the branches of the exhaust manifold and terminating in close proximity to the exhaust valves.

It is alternatively possible to rely on a catalytic converter to complete the combustion and in this case the ram air may be injected at a common point upstream of the catalytic converter.

The invention will now be described further, by way of example, with reference to the accompanying drawings, in which.

Figure 1:
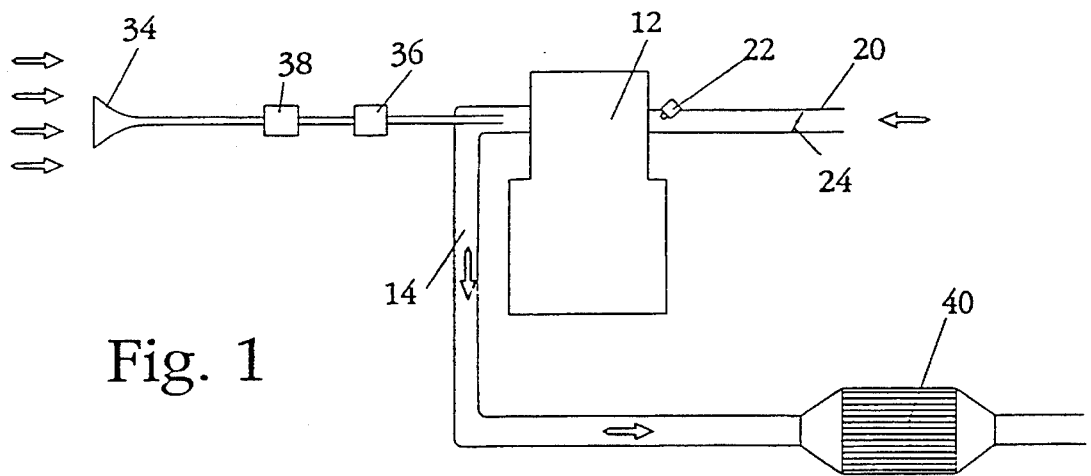
FIG. 1 is a block diagram of an engine of the present invention.
Figure 2:
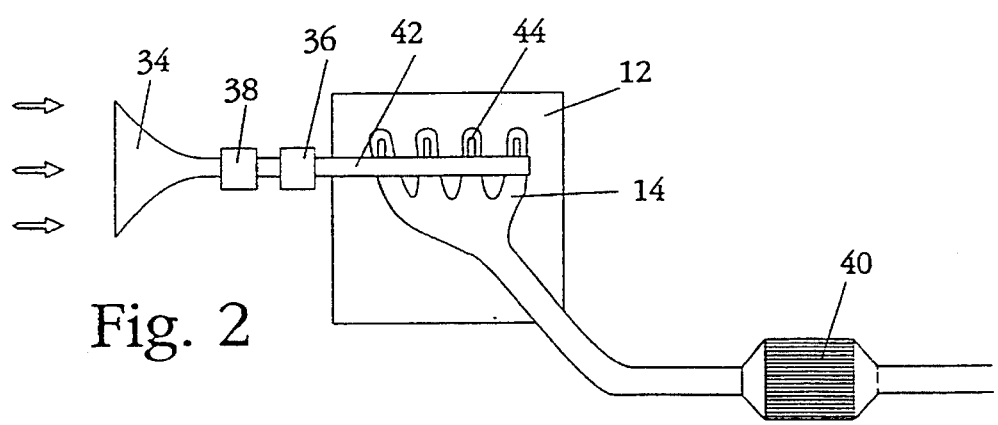
FIG. 2 shows a schematic side view of the engine in FIG. 1.
Figure 3:
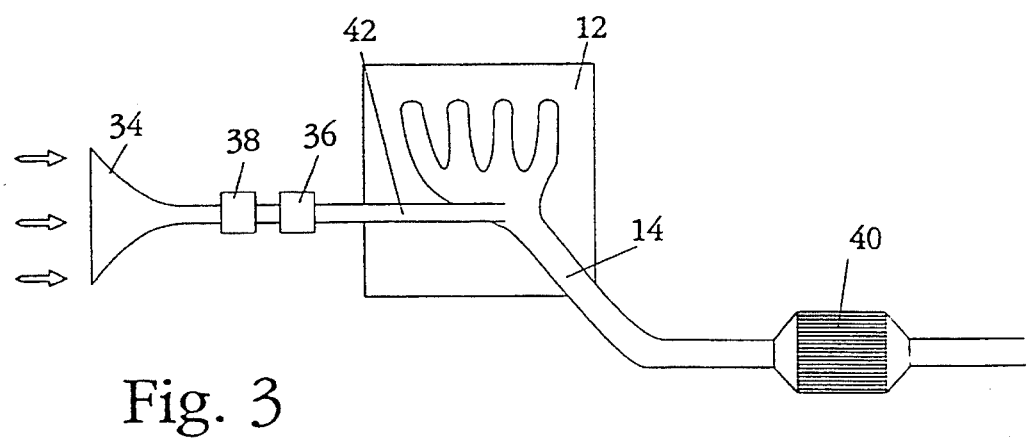
FIG. 3 is a view similar to that of FIG. 2 showing an engine having an alternative configuration of the exhaust system.

Referring to FIGS. 1 and 2, an engine 12 has an exhaust manifold which leads to a downpipe 14 incorporating a catalytic converter 40. An air scoop 34 is mounted in a position on the vehicle at which a positive aerodynamic pressure is developed as a result of vehicle movement, for example in a forward facing position at the front of the vehicle. The air scoop 34 is connected by way of an optional non-return valve 38 and an isolation valve 36 to a distribution rail 42 having individual branch pipes 44 which pass through the branches of the exhaust manifold and terminate adjacent the engine exhaust valves. In the alternative embodiment of FIG. 3, the branch pipes 44 are omitted and instead the rail is connected upstream of the catalytic converter 40 to a point common to the exhaust gases of all the engine cylinders.

On the intake side, the engine has an intake manifold 20 having a throttle 24 to control engine load and fuel injectors 22 arranged adjacent the individual intake ports.

Figure 4:
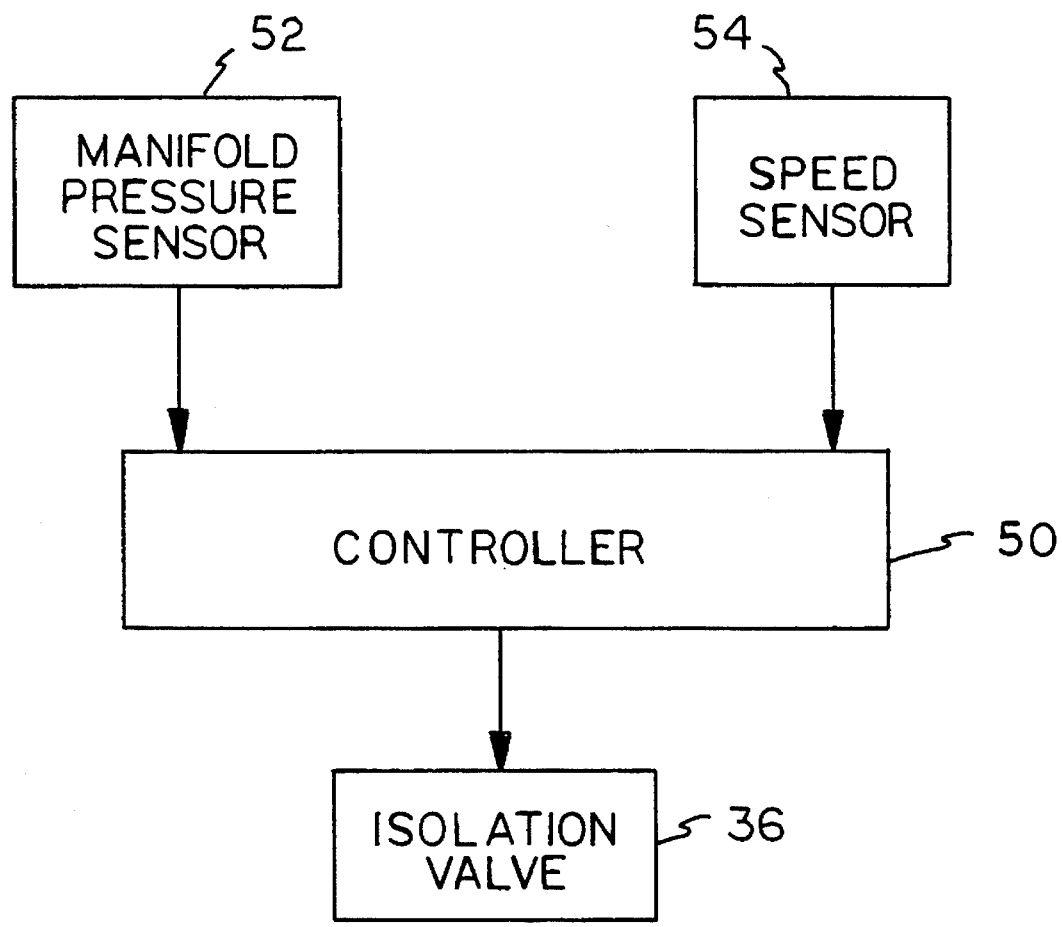
FIG. 4 is a block diagram of a control system according to one aspect of the present invention.

The isolation valve 36 is open only during deceleration modes, i.e. when the engine throttle valve 24 is closed and the engine is overrunning. During such operation, the manifold vacuum is high for the particular engine speed. This condition may be detected by means of electronic control unit 50 (FIG. 4) connected to speed sensor 54 and manifold pressure sensor 52 and arranged to send a signal to open the isolation valve 36 when the manifold vacuum exceeds a given speed related threshold. Alternatively, the valve 36 may be directly controlled by a vacuum actuator avoiding the need for electronic control.

In operation, when the throttle 24 is shut to decelerate the vehicle, using the engine for braking, the manifold 20 in the vicinity of the intake ports is still wet with fuel and this results in a rich mixture being burnt in the combustion chambers, notwithstanding the fact that no further fuel is introduced by means of the injectors 22.

The combustion charge does not contain sufficient air to complete the combustion of the fuel and when monitoring the hydrocarbon and carbon monoxide emissions on a cycle by cycle basis one finds large increases in hydrocarbon and carbon monoxide concentrations which decay gradually until all the fuel wetting the manifold has been used up.

One could counteract this problem by introducing air on the intake side to avoid the excessively rich mixture causing this problem but that is not a viable solution because it adversely affects engine braking and is disconcerting to the driver.

The present invention therefore is based on counteracting this surge in emissions, by introducing ram air into the exhaust system to complete the combustion of these emissions before they are discharged to atmosphere. The completing of the oxidation can either take place in the catalytic converter 40, if one is present or by thermal oxidation which makes use of the heat already present in the exhaust gases immediately on leaving the combustion chambers. If oxidation is taking place in a catalytic converter, the point of air injection is not critical so long as it is upstream of the converter 40. However, if thermal oxidation is to take place, it is important to inject the air as near as possible to the exhaust valves before the gases have even had a chance to be cooled by the walls of the exhaust port and exhaust system.

The ram air is available when the vehicle is in motion and does not require any expenditure on a compressor. Furthermore, the ram air pressure is permanently available whereas a compressor needs some time to build up to its full capacity when it is first switched on. Because a fast response is needed, a compressor would need to be left running continuously and the energy consumption of the compressor would not be justified.

The exhaust back pressure during deceleration modes is minimal and there is no serious resistance to injection of air at such times. The ram air pressure is therefore more than sufficient for the purpose.

If an electronic control system is used to open the isolation valve 36 it is possible to guarantee that the ram air pressure is greater than the exhaust back pressure when the isolation valve 36 is open, thereby eliminating any possibility of reverse flow of exhaust gases through the air scoop 34. Should a vacuum operated isolation valve be used, or additional security be needed when using electronic control, one can ensure that such reverse flow never occurs by placing a further non-return valve 38 in series with the isolation valve 36 but it is important then to use a non-return valve which opens under very low pressures to avoid an excessive drop of pressure across the non-return valve 38.

I claim:

1. A liquid fueled internal combustion engine for an automotive vehicle, comprising:

an air intake system for introducing air and fuel charge into combustion chambers contained within the engine;

an air scoop acting as a source of ram air which is presurized by forward movement of the vehicle;

an exhaust system for handling exhaust from the engine;

at least one exhaust port leading from each combustion chamber to the exhaust system, with flow through the exhaust port being controlled by an exhaust valve;

an isolation valve connected between the air scoop and the exhaust system such that ram air is fed into the exhaust system only during engine deceleration modes.

2. An internal combustion engine as claimed in claim 1, wherein the isolation valve (36) is operated by an electronic control unit having sensors detecting manifold vacuum and engine speed, the valve being opened when the manifold vacuum exceeds a speed related threshold.

3. An internal combustion engine as claimed in claim 1, wherein the isolation valve (36) is operated by a vacuum actuator connected to manifold vacuum.

4. An internal combustion engine as claimed in claim 1, wherein a non-return valve (38) is arranged in series with the isolation valve (36).

5. An internal combustion engine as claimed in claim 1, wherein the ram air is fed individually into each exhaust port by means of a rail having branches passing through the branches of the exhaust manifold and terminating in close proximity to the exhaust valves.

6. An internal combustion engine as claimed in claim 1, having a catalytic converter and in which ram air is introduced into the exhaust system at a point common to all engine cylinders upstream of the catalytic converter.

\* \* \* \* \*